UNITED STATES PATENT OFFICE.

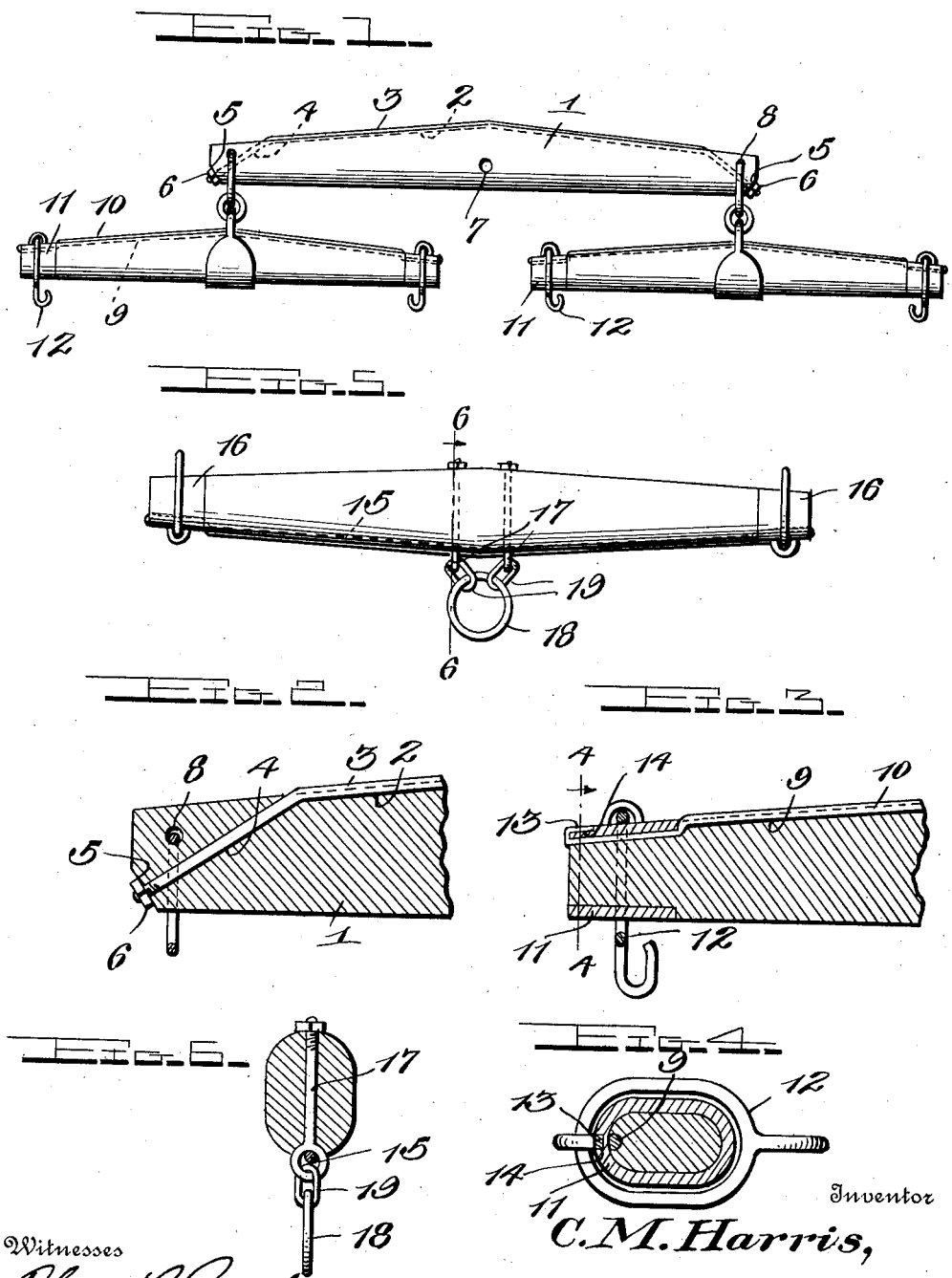

CHARLES M. HARRIS, OF PUTNAM, OKLAHOMA.

WHIFFLETREE.

1,057,148.  Specification of Letters Patent.  Patented Mar. 25, 1913.

Application filed July 6, 1912. Serial No. 708,010.

*To all whom it may concern:*

Be it known that I, CHARLES M. HARRIS, a citizen of the United States, residing at Putnam, in the county of Dewey and State of Oklahoma, have invented certain new and useful Improvements in Whiffletrees, of which the following is a specification, reference being had to the accompanying drawings.

This invention has reference to new and useful improvements in neck yokes, swingle trees and double trees which are made of cylindrical pieces of wooden material, and braced or strengthened by a metallic truss rod, thereby materially strengthening and stiffening the same, and the primary object of this invention is to so construct and combine the parts of a truss or a brace rod so that it will be kept in place at the rear of the whiffletree and always serve its function of bracing the tree and prevent it from bending.

A further object of this invention is to contruct a brace rod so that it may hold the ferrules upon the tree, thereby eliminating the use of bolts or other fastening means which have a tendency to become loose during the dry seasons of the year.

With the above and other objects in view, this invention consists in the improved construction and novel arrangement and combination of parts which will be hereinafter fully described and particularly pointed out in the appended claim.

In the accompanying drawings has been illustrated a simple and preferred form of the invention, it being, however, understood that no limitation is necessarily made to the precise structural details therein exhibited, but that the right is reserved to any changes, alterations and modifications to which recourse may be had within the scope of the invention and without departing from the spirit or sacrificing the efficiency of the same.

In the drawings, Figure 1 is a plan view of double and swingle trees constructed according to my invention. Fig. 2 is an enlarged sectional view through one end of the double tree. Fig. 3 is an enlarged sectional view taken through one end of the swingle tree. Fig. 4 is a transverse section taken on the line 4—4 of Fig. 3. Fig. 5 is a plan view of a neck yoke showing my invention as applied thereto, and Fig. 6 is a transverse section taken through the same on the line 6—6 of Fig. 5.

Reference now being had to the accompanying drawings wherein corresponding parts are indicated by like numerals throughout the several views, the whiffletree 1 is made preferably of wooden material having a straight front edge and a rear edge inclined forwardly from its center toward the ends, so that the thickest part of the tree will be in the center thereof. The whiffletree used in conjunction with my invention is provided along its rear edge with a semi-circular groove 2 in which is mounted a strengthening or truss rod 3 made preferably of one continuous piece of metal and cylindrical in cross section. The outer extremities of the whiffletree are provided with diagonally extending apertures 4 which are connected at their inner ends with the semi-circular groove 2 and the outer extremities thereof extending toward the forward end of the double tree to a flattened portion indicated by the numeral 5. The extremities of the truss rod 3 extend within the apertures 4 formed in the extremities of the double tree and are threaded to receive the nut 6, whereby the same may be securely held within the double tree. This double tree is further provided with an opening 7 by which the same may be connected in the usual manner to the pole of a vehicle, and its outer extremities are each provided with an aperture 8 which extends through the double tree in the rear of the truss rod and in which is mounted the usual clevises for connecting the swingle trees thereto. The swingle trees are each also provided with a semi-circular groove 9 formed in the rear edge thereof and also have a similar metallic brace rod 10. The outer extremities of the swingle trees are provided with the usual thimbles or ferrules 11 to which are connected the hooks 12 for attaching the same to the harness traces. The outer extremities of the brace rods 10 are flattened, as at 13, and extend within a recess of the same configuration formed in the outer extremities of the swingle trees below the ferrule.

I provide means for securing the ferrules to the brace rods, thereby not only adding to the durability of the trees, but also providing means for securely holding the ferrules upon the trees. In this construction, the periphery of each of the ferrules is provided with a recess 14 adjacent the outer edge thereof for receiving the extremities of the flattened portions 13 of the brace rods. The extremities of these flattened portions extend beyond the outer edge of the trees and are then bent back upon the ferrules and adapted to rest within the recesses 14 formed therein.

The neck yoke as shown in Figs. 5 and 6 of the drawings is also made of a cylindrical piece of wood being enlarged in its central portion and tapered toward its outer extremities. The lower face of this neck yoke is provided with a groove in which is mounted a truss rod 15 of the same construction as the brace rods used in the swingle trees. The outer extremities of this neck yoke are provided with ferrules 16 each having connected thereto a ring to provide means for connecting the breast strap of the harness thereto. The outer extremities of the brace rod 15 are also flattened and adapted to rest within recesses formed in the ferrules 16 for securing the same to the neck yoke in the same manner as connecting the ferrules 11 to the swingle trees. The central portion of the neck yoke is provided with a pair of parallel extending eye bolts 17 which are embedded within the neck yoke, as more clearly shown in Fig. 6 of the drawing, and the outer extremities are connected to a ring 18 by means of links 19. This ring 18 is adapted to fit over the extremity of the tongue for connecting the yoke thereto in the usual well known manner.

From the foregoing description taken in connection with the accompanying drawings, it is apparent that the device of the present invention is very strong, durable and efficient in use and at the same time is comparatively light, as it combines wooden and metallic parts in such a manner as to give strength and durability and at the same time retain the lightness of an ordinary whiffletree.

What I claim is:—

A swingle tree comprising a body made of wooden material having a straight front edge and a rear edge inclining toward the outer extremities thereof, the rear edge thereof having a semi-circular recess formed therein, the outer extremities of the swingle tree being reduced and having ferrules mounted thereupon, the said reduced portions each having a recess formed therein in alinement with the recess formed in the rear edge of the swingle tree, in combination with a truss rod being cylindrical in cross section, the outer extremities of said truss rod being offset and substantially rectangular in cross section, the said offset portions adapted to rest within the said recesses and extend beyond the outer edges of the ferrules, and the said extensions adapted to be bent back upon the ferrule and rest within recesses formed within the periphery of the said ferrules adjacent the outer extremities thereof, substantially as and for the purpose specified.

In testimony whereof I hereunto affix my signature in the presence of two witnesses.

CHARLES M. HARRIS.

Witnesses:
J. D. ADAIR,
E. C. DAVIS.

---

Copies of this patent may be obtained for five cents each, by addressing the "Commissioner of Patents, Washington, D. C."